United States Patent [19]

Vindez

[11] Patent Number: 5,022,800
[45] Date of Patent: Jun. 11, 1991

[54] RAPID ADVANCE FEED DRILL WITH IDLE MODE

[75] Inventor: Pierre G. Vindez, Redondo Beach, Calif.

[73] Assignee: P.V. Tool, Inc., Gardena, Calif.

[21] Appl. No.: 549,954

[22] Filed: Jul. 9, 1990

[51] Int. Cl.$^5$ .............................................. B23B 45/04
[52] U.S. Cl. ........................................ 408/14; 173/19
[58] Field of Search ................. 408/14, 132, 137, 130, 408/11; 173/19, 146, 145, 29

[56] References Cited

U.S. PATENT DOCUMENTS

| | | | |
|---|---|---|---|
| 3,679,320 | 7/1972 | Bohorquez | 408/14 X |
| 4,111,590 | 9/1978 | Burkart et al. | 408/14 |
| 4,418,767 | 12/1983 | Vindez | 173/19 |
| 4,443,139 | 4/1984 | Eash | 408/14 |
| 4,538,942 | 9/1985 | Vindez | 408/14 |
| 4,612,998 | 9/1986 | Vindez | 173/19 |
| 4,850,753 | 7/1989 | Dudden | 408/14 |

*Primary Examiner*—William Briggs
*Attorney, Agent, or Firm*—Antonio M. Fernandez

[57] ABSTRACT

A positive feed drill having a spindle drive gear train and a spindle feed gear train coupled to the drive gear train is provided with means for uncoupling the feed coupling gear from the drive coupling gear, and locking the feed coupling gear when the spindle has been fed a predetermined extent, thereby placing the drill in retract mode, and for unlocking the feed coupling gear, once the spindle is retracted, without recoupling it to the drive gear train, thereby placing the feed gear train in an idle mode until the aforesaid uncoupling means is manually reset. The drill is further provided with a rapid advance coupling gear keyed to drive a shaft which turns the drive coupling gear and with a rapid advance idle gear meshed with the rapid advance coupling gear. The gear ratio of the rapid advance coupling gear to the rapid advance idle gear is selected to be greater than the gear ratio of the feed coupling gear to the normal idle feed gear. A rapid advance control button, when depressed, will place the drill in the idle mode if not already in the idle mode and will force the rapid advance idle gear toward the feed coupling idle gear causing a clutch between those two idle gears to engage.

8 Claims, 2 Drawing Sheets

RAPID ADVANCE FEED DRILL WITH IDLE MODE

BACKGROUND OF THE INVENTION

This invention relates to positive feed power drills of the type disclosed in U.S. Pat. No. 4,538,942 having a stop-feed control and U.S. Pat. No. 4,612,998 having an idle mode control, and more particularly to adding means for rapid-advance control to idle-mode control of the spindle feed gear train for drilling or countersinking.

In positive feed power drills, the spindle is threaded into a feed gear that turns for advancing the spindle as the drill progresses through a work piece. The feed gear is driven by a gear train from the same motor as the drive gear train, but the gear ratio of the drive gear train is selected to be slightly less than the gear ratio of the feed gear train so the feed gear will turn slightly faster than the drive gear. In that way, the spindle is advanced a predetermined amount for each turn of the drill through the work piece.

Once the spindle has been advanced sufficiently, a hydraulic piston is actuated to raise the spindle feed coupling gear from the drive coupling gear thereby disengaging a clutch comprised of meshing side teeth and locking the spindle feed coupling by side teeth on the upper side of the spindle feed gear against teeth affixed to the drill housing. As the motor continues to drive the spindle in the same direction, the spindle threads turn inside the last gear of the locked spindle feed gear train to rapidly retract the spindle. After the spindle has been fully retracted, hydraulic pressure will still be on the piston, so the feed gear train is forced by the spindle to rotate at the same rate as the drive gear train. Consequently, locking side teeth of the spindle feed coupling gear will ratchet over the teeth affixed to the housing until pressure in the piston cylinder has been manually relieved. See U.S. Pat. No. 4,538,942.

To eliminate ratcheting once the spindle has been fully retracted, the hydraulic pressure is automatically removed from the piston, and latching means continues to hold the spindle feed gear train out of engagement with the spindle drive gear train after the hydraulic pressure is removed, thus placing the drill in an idle mode until such time as the latching means is manually reset to recycle the positive feed drill for another drilling or countersinking cycle. See U.S. Pat. No. 4,612,998.

The piston operative for that retract and idle mode is placed on top of the coupling gear shaft, and the idle-mode latching means is provided on the bottom of that shaft in the form of a notched push rod in a sleeve with its axis perpendicular to the axis of the shaft. The notch is provided for the shaft to drop under the force of a return spring when the rod is pushed back in against a spring in the sleeve. The depth of the notch is sufficient to reset the drill for the next drilling cycle by allowing side teeth of the feed coupling gear to again engage side teeth of the drive coupling gear. The positive feed drill is then in a drilling or countersinking mode.

At any time the positive feed drill is in the idle mode and it is desired to advance the spindle for another drilling operation or after drilling through one of two plates spaced apart, it would be advantageous to more rapidly advance the spindle to conserve operating time. Consequently, an object of this invention is to provide the feature of rapid advance of a positive feed drill spindle on command of the drill operator, and more particularly to add that feature in a positive feed drill of the type having a retract and idle mode as disclosed in U.S. Pat. No. 4,612,998.

SUMMARY OF THE INVENTION preferably practiced in a positive feed drill of the type just described having a spindle feed coupling gear releasably locked to the spindle drive coupling gear on a shaft by side teeth for turning the spindle feed gear train as the spindle drive gear is turned by a motor. The feed coupling gear is mounted with a bearing over a collar on the same shaft that the drive coupling gear is mounted, and the drive coupling gear is mounted with a bearing on a sleeve around the shaft so that the shaft, collar and spindle feed coupling gear may be displaced axially against the force of a coil spring over the shaft without moving the drive coupling gear relative to the drill housing.

The base of the shaft is supported by a piston in a cup. A piston rod passes through a hole in the center of the cup and rests in a notch on the side of a push rod in a sleeve provided as an integral part of the cup. The sleeve is oriented so that the axis of the piston rod intersects the axis of the push rod at a right angle. A coil spring between the end of the push rod and the sleeve urges the push rod out, but a stopping means prevents the push rod from falling out of the sleeve. When the spindle is to be retracted, hydraulic pressure is admitted to the piston to raise the shaft, collar and spindle feed coupling gear in order to lock the feed coupling gear until the spindle is fully retracted, at which time the hydraulic pressure is removed from the piston to allow the force of the coil spring over the shaft to cause the raised gear shaft to drop down on the push rod to one side of the notch. The drill is then in an idle mode until the notched rod is pushed in to allow the gear to drop back to a position where the drive and feed coupling gears are again locked by side teeth to turn together.

When rapid advance of the spindle is desired, a manual control push button on the side of the drill housing opposite the piston in a cup is depressed to operate a rapid advance control valve that admits hydraulic pressure into the space between the piston and cup, thus raising the piston to lift the coupling gear shaft and in turn lift the spindle feed coupling gear away from the spindle drive coupling gear, thereby disengaging side teeth of the spindle feed coupling gear from the spindle drive coupling gear. As the manual control push button is depressed, an idle-stop disk over the coupling gear shaft is wedged down on top of that gear shaft so that the shaft will not be raised sufficiently for side teeth on the feed coupling gear to lock on teeth affixed to the housing. The control push button for commanding rapid advance of the spindle is attached to a rod that is beveled on the end to meet a beveled surface on top of the idle-stop disk over the coupling gear shaft. Depressing the control button thus cams the idle-stop gear over the coupling gear shaft. In that way, the positive feed drill will go directly into the idle mode without first entering the spindle retract mode. The normal spindle feed gear train is thus uncoupled from the spindle drive gear train, as in the idle mode, if not already in the idle mode.

The piston rod normally seated in the notch holds the push rod in its sleeve against the force of the compressed coil spring. When the piston in the cup is raised by the hydraulic pressure on command for rapid advance of the spindle, the piston rod is raised out of the notch in the push rod, and the notch slides out from under the piston rod. That latches the gear shaft in a raised position for the idle mode, if it was not already in the idle mode.

At one end of the shaft for the spindle drive and feed coupling gears opposite the piston in a cup, there is a rapid advance spindle feed coupling gear that is keyed to slide on and turn with the coupling gear shaft. That rapid advance coupling gear meshes with an auxiliary idle gear. The gear ratio of the rapid advance coupling gear and the auxiliary idle gear is selected to be greater by some factor (e.g., 2) than the gear ratio of the normal spindle feed coupling gear and its idle gear. Consequently, the rapid advance coupling gear and the auxiliary idle gear rotate together as long as the coupling drive gear shaft is being rotated by a motor. Hydraulic pressure from the same rapid advance control valve that causes a piston to raise the coupling gear shaft to place the coupling feed gear in an idle mode pushes a rapid advance piston against the force of a coil spring around the idle gear shaft, which in turn pushes the auxiliary idle gear toward the normal spindle feed idle gear. A clutch between those two idle gears comprised of side teeth then engages to rotate the spindle feed idle gear at a rate faster than under the normal spindle feed mode. This produces rapid advance of the spindle while the spindle continues to be driven at a constant speed. The clutch engagement force between the auxiliary idle gear and the normal spindle feed idle gear can be varied in order that the spindle's forward thrust be adjusted according to the application by means for adjusting the position of a seat for the coil spring around the idle gear shaft.

To terminate rapid advance, the control button is released, and a return spring moves the control button back to its original position. That closes the valve which provided the rapid advance hydraulic pressure to both pistons and releases that pressure on the pistons to leave the positive feed drill in the idle mode. To re-engage normal spindle feed, the notched push rod is manually pushed back into its sleeve against the force of a the coil spring until the piston rod drops back into the notch, thus allowing the spindle feed coupling gear to move back into engagement with the spindle drive coupling gear.

The novel features of the invention are set forth with particularity in the appended claims. The invention will best be understood from the following description when read in connection with the accompanying drawings.

DESCRIPTION OF PREFERRED EMBODIMENTS

Figure 1:
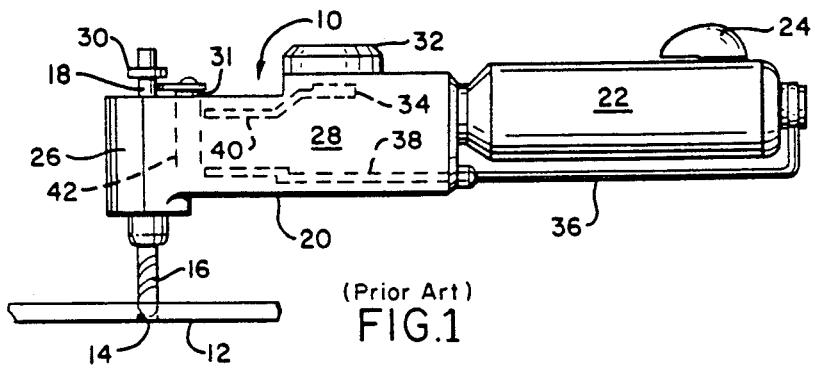
FIG. 1 is a side view in elevation of a prior art positive feed drill for drilling holes through a work piece, as disclosed in U.S. Pat. No. 4,418,767.

The positive feed drill disclosed in the aforesaid U.S. Pat. No. 4,612,992 will be described in more detail as the preferred environment for the present invention, but first the prior-art of FIG. 1 will be described. A positive feed drill 10 is shown on a work piece 12 through which a hole 14 is to be drilled by a bit 16 on the end of a spindle 18, or into which a hole is to be countersunk. In practice, a spacer is attached to a main housing 20 of the drill, and the entire assembly is either clamped or hand held on the work piece. An air driven motor 22, with a hand operated lever switch 24, drives the spindle through a gear train in the main housing 20. See U.S. Pat. No. 4,418,767. The added feature of a retract mode followed by an idle mode disclosed in U.S. Pat. No. 4,612,992 will now be described with reference to FIGS. 2, 3 and 4.

Positive Feed Drill With Retract and Idle Modes

The main housing 20 encloses a spindle actuator section 26 and a gear train section 28. These two sections include a spindle drive gear train for turning the spindle 18 and a spindle feed gear train for advancing the spindle as it turns. An adjustable nut 30 on the spindle 18 (fixed in a selected position by a set screw) actuates a valve stem 31 to cause the spindle to be retracted. A cap 32 provides access to a piston 34 over a shaft 52 for a spindle drive coupling gear 51 and a spindle feed coupling gear 58. The piston 34 disengages the spindle feed gear train and locks it so that continued turning of the spindle drive gear train retracts the spindle when the piston is caused to move up in a cylinder under the cap 32 under hydraulic pressure admitted through a tube 36 that couples air under pressure to the main housing.

Passages 38 and 40 (FIG. 1) convey air from the tube 36 to the piston 34 via a valve 42 (FIG. 1) actuated by the valve stem 31 is caused to move downwardly when the nut 30 on the spindle has reached the top of the valve stem after drilling. Moving the valve stem down causes the air passage 38 to be connected to the air passage 40 by the valve 42. This admits air under pressure into the piston cylinder to raise the piston 39 and disengage the spindle feed train thereby causing the spindle 18 to be retracted. Once the valve stem is moved down, it will protrude from the bottom of the drill housing 20 and engage a nut 30a to return the valve stem 31 after the spindle is retracted. That automatically initiates another drilling cycle, unless the motor 22 has been turned off by the lever switch 24 (FIG. 1).

Before proceeding with a detailed description of the retract and idle mode, the arrangement for driving and feeding the spindle 18 will first be described in greater detail. A beveled gear 46 keyed on the motor shaft 47 meshes with a beveled gear 48 on a vertical shaft 49. Integral with the beveled gear 48 is a gear 50 which meshes with a drive coupling gear 51 on the vertical shaft 52 for the spindle drive train comprised of idlers 53 and 54 on respective vertical shafts 55 and 56, and a gear 57 slidably keyed to the spindle 18. Mounted on a collar 75 around the shaft 52 is the feed coupling gear 58 for the spindle feed gear train comprised of idle gears 59 and 60 on shafts 55 and 56, and a spindle feed gear 61 threaded on the spindle 18. As the motor turns, the gear 57 turns, thus turning the spindle. The key, or keys, which cause the spindle to rotate with the gear 57 slide in longitudinal slots or keyways (not shown) in the spindle so the spindle may advance.

The feed coupling gear 58 is normally locked onto the drive coupling gear 51 by side teeth so that it too is driven by the motor through the beveled gears 46 and 48, and the gear 50 locked with the beveled gear 48. Thus, the drive coupling gear 51 turns the feed coupling gear 58 through interlocking side teeth. The spindle feed gear 61 is thus turned through the idle gears 59 and 60 while the drive coupling gear 51 turns the spindle drive gear 57 through the idlers 53 and 54. If the gear ratios of both trains were the same, the spindle feed gear 61 would turn with the spindle drive gear 57, and the spindle 16 would not be advanced toward the work piece. Consequently, the gear ratio is made slightly higher for the feed gear 61 so that, as it turns faster than the spindle drive gear 57, its threads engaging the threaded spindle 18 will feed the spindle toward the work piece at a rate proportional to the difference in speed of rotation of the gears 57 and 61.

Retract Mode

When the spindle has been advanced sufficiently for the nut 30 to actuate the valve stem 31, air under pressure is connected from the passage 38 to the passage 40 shown in FIG. 1. This air under pressure forces the piston 34 upwardly against the force of a compression coil spring 72 between the gear housing (outside of the piston cylinder 73) and bearing 74 supported on the collar 75 to engage upper side teeth 76 of the feed coupling gear 58 with fixed teeth 77 on the inside of the gear housing. This locks the feed gear train and causes the spindle to be retracted as the drive gear 57 continues to rotate the spindle 18 in the same direction, until the valve stem is returned to its initial position by nut 30a to release pressure from the piston cylinder 73, thereby allowing spring 72 to return the feed coupling gear 58 to its initial position in engagement with the drive coupling gear 51.

Idle Mode

The idle-mode feature of the prior-art drill of FIG. 2 will now be described in greater detail since it is not only retained in the present invention but is used as part of the rapid advance mode that is added to the prior-art drill of FIG. 2. The shaft 52 is raised by the piston 34 to lock the feed gear train. The end of the shaft opposite the piston i thus raised out of engagement with a notch 80 in a rod 82 guided in a sleeve 84 that is perpendicular to and made as a unitary part of a sleeve 86 for the shaft 52 on which the drive coupling gear 51 is journaled with a ball bearing so that the shaft 52 may move axially without raising the drive coupling gear 51 for that would bring it into engagement with the idle gear 59 in the feed gear train. A compression coil spring 88 then pushes the rod so that the notch 80 is no longer in alignment with the shaft, as shown in FIG. 3. A transverse pin 90 prevents the notched rod from being pushed completely out of the guide sleeve 84. At the end of the spindle return, when the nut 30a moves the valve stem 31 to the upper position, the valve 42 (FIG. 1) relieves the air pressure to the piston cylinder 73.

Figure 4:
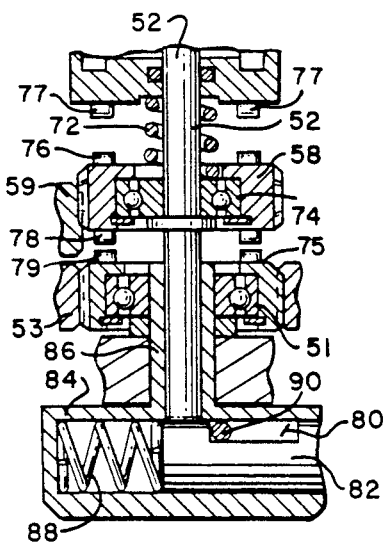

Once the spindle is retracted, and the air pressure in the piston cylinder 73 is released, the feed coupling gear 58 is returned by the coil spring 72 so that it is no longer in locking engagement with teeth 77 on the gear housing by the spring 72, as shown in FIG. 4, but the bottom of the shaft 52 is then seated against the rod 82, so that the feed coupling gear does not drop far enough for its lower side teeth 78 to re-engage upper side teeth 79 on the drive coupling gear 51. The positive feed drill is then in an idle mode.

To reset the spindle feed gear train for the next drilling or countersinking operation, the rod 82 is manually pushed back into the guide sleeve 84 against the force of the spring 88 using a push button 94. The coil compression spring 72 around the shaft 52 then restores the feed coupling gear 58 to its normal position shown in FIG. 2, which is in the spindle feed mode.

Rapid Advance Mode

Figure 5:
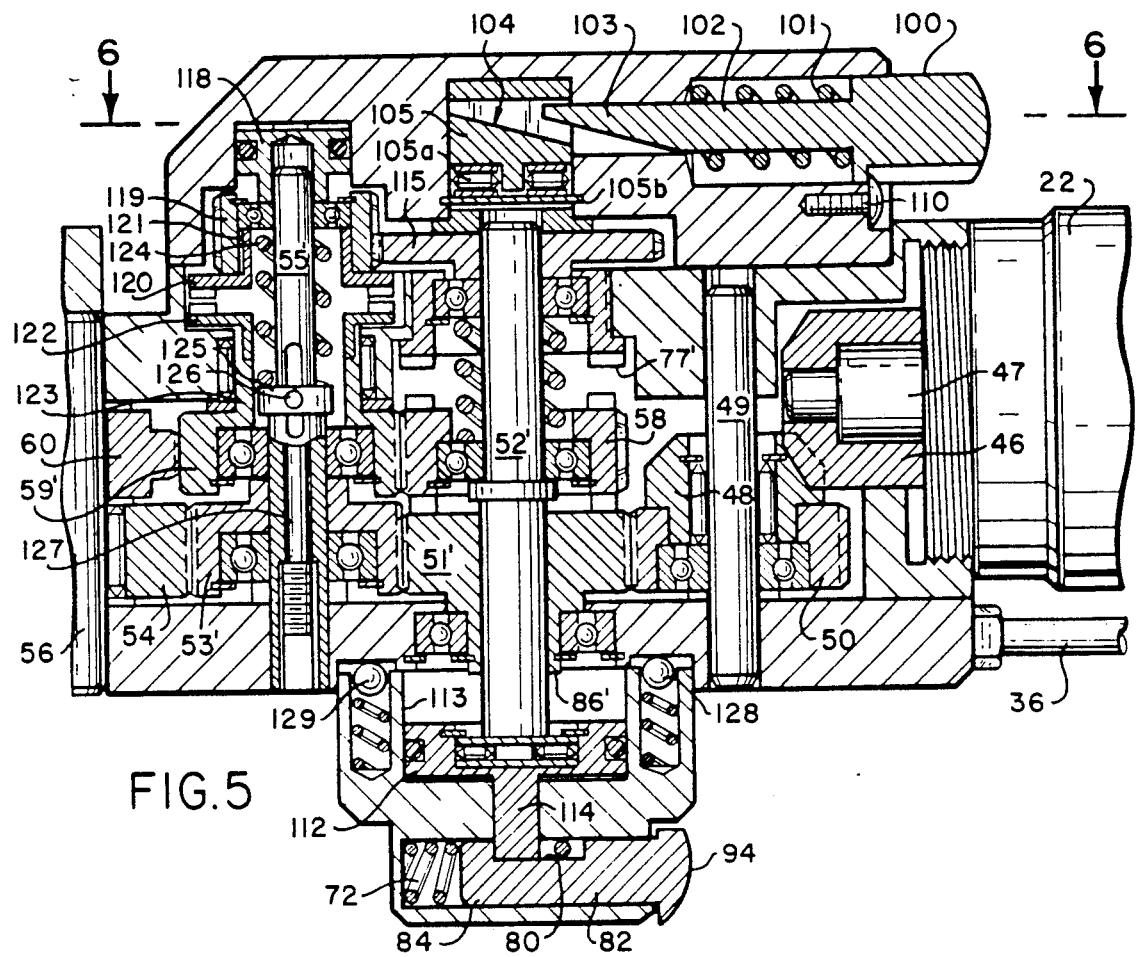
FIG. 5 is a vertical cross section of part of a positive feed drill having a rapid advance mode for the spindle feed added to the retract mode and the idle mode of the prior-art drill shown in FIG. 2 in accordance with the present invention.

The rapid advance feature added to a positive feed drill with retract and idle modes will now be described with reference to FIG. 5 wherein the motor 22 and air pressure line 36 at one end are the same as in prior-art FIGS. 1 and 2, and the spindle drive and feed components 18, 30, 31, 30a, 54, 56, 57, 60 and 61 are the same (only 54, 56 and 60 are shown in FIG. 5), and are therefore identified in FIG. 5 by the same reference numerals. The motor drive components 46, 47, 48, 49 and 50 are also the same and identified by the same reference numerals as in FIG. 2. Between those two sets of components on the left and on the right are the components necessary for implementing retract and idle modes as in FIG. 2, but modified to incorporate the new rapid advance mode. Therefore, the same reference numeral will be used for these components in between that are essentially the same, and primed reference numerals will be used for the same components that have been modified in some significant way. New components added will be identified by reference numerals having three digits. It will thus be evident that the motor drive components for the spindle drive coupling gear 51' and idle gear 53' remain the same in function with only slight modification, and that the spindle feed coupling gear 58 and idle gear 59' also remain the same in function but with more extensive modification of the idle gear 59' in order to incorporate the new rapid advance mode with the old idle mode which remains essentially the same in organization and function for spindle retract and then idle mode described with reference to FIG. 2.

Figure 6:
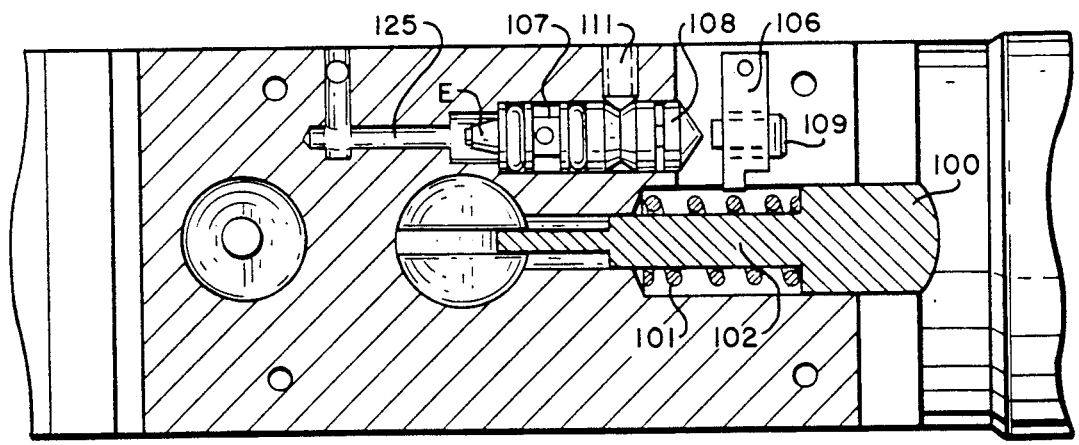
FIG. 6 is a cross section taken on a line 6—6 in FIG. 5.

When rapid advance of the spindle is needed, a manual control button 100 on top of the drill is pushed in against a coil spring 101 around a rod 102 that is beveled on the end 103 to meet a beveled surface 104 on top of an idle-stop disk 105. The reason for having that beveled surface 104 will become apparent; for the present it is sufficient to understand that upon pushing the button 100 to force the beveled end 103 over the beveled surface, the push button 100 will pivot a valve actuator arm 106 shown in FIG. 6 to actuate a valve 107 through a valve trigger 108. A set screw 109 adjusts for the setting of the normal position of the arm 106 against the trigger 108 before it is pushed at the last moment by the push button 100. The initial position of the push button 100 is in turn adjusted relative to the idle-stop disk 105 by a cap screw 110 shown in FIG. 5.

Figure 7:
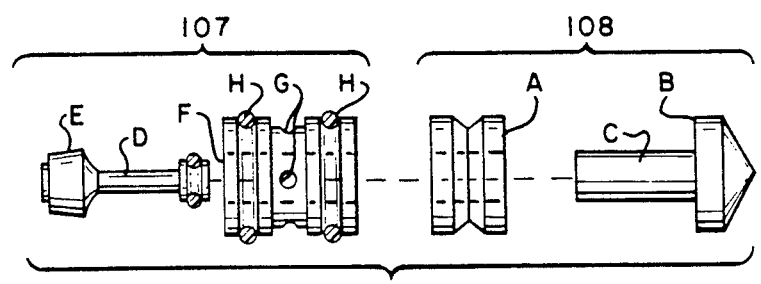
FIG. 7 is an exploded view in cross section of a valve used for rapid advance control.

The valve trigger 108 is a two-piece assembly shown in FIG. 7. One piece, A, is held firmly in place against the valve 107 by a set screw 111 shown in FIG. 6. The other piece B has a stem C passing through piece A. When the pivot arm 106 pushes against piece B, the stem C will protrude further out of piece A. The stem C pushes a stem D in the valve 106, unseating a rubber stop E from the valve seat F to allow air under pressure to enter the valve from left to right and exit through apertures G in a small diameter section between O-rings H. From there the air under pressure is admitted simultaneously into two passages in the drill housing leading to a piston 112 in a cup 113 at the bottom of shaft 52' and a piston 118 over shaft 55' for rapid advance. Note that the piston 112 has a rod 114 passing through the center of the cup 13.

When the push button 100 is released, the coil spring 101 will return the push button against the retaining cap screw 110 (FIG. 5) and allow the compressed air at 125 (FIG. 6) to return the rubber stop E to its original position against the valve seat, thus cutting off air under pressure to the pistons 112 and 118 which are vented through bleeding holes provided in the walls of cylinders containing pistons 112 and 118. This allows the shaft 52' to rest on the idle-mode control rod 82 in the sleeve 84 under the force of spring 72 thus leaving the positive feed drill in the idle mode with the spindle still turning, but with the spindle feed gear train idle, as described with reference to FIG. 4.

As in that prior-art idle mode, the positive feed drill remains in the idle mode until the idle-mode control pus button 94 is manually pushed against the spring 72 to allow the piston rod 114 to drop back into the notch 80 to allow side teeth 78 of the spindle feed coupling gear 58 to engage side teeth 79 of the drive coupling gear 51' as described with reference to FIG. 4. The drive coupling gear 51' is modified to provide a sleeve 86' that will allow the shaft 52' to slide up and down without any displacement of the gear 51' as the piston 112 is forced up in the cup 113 which forms the cylinder for the piston 112 and is made as an integral part of the sleeve 84 for the notched rod 82. When the piston rod 114 is seated in the notch 80, the drill is in the normal positive feed drilling or countersinking mode.

Figure 2:
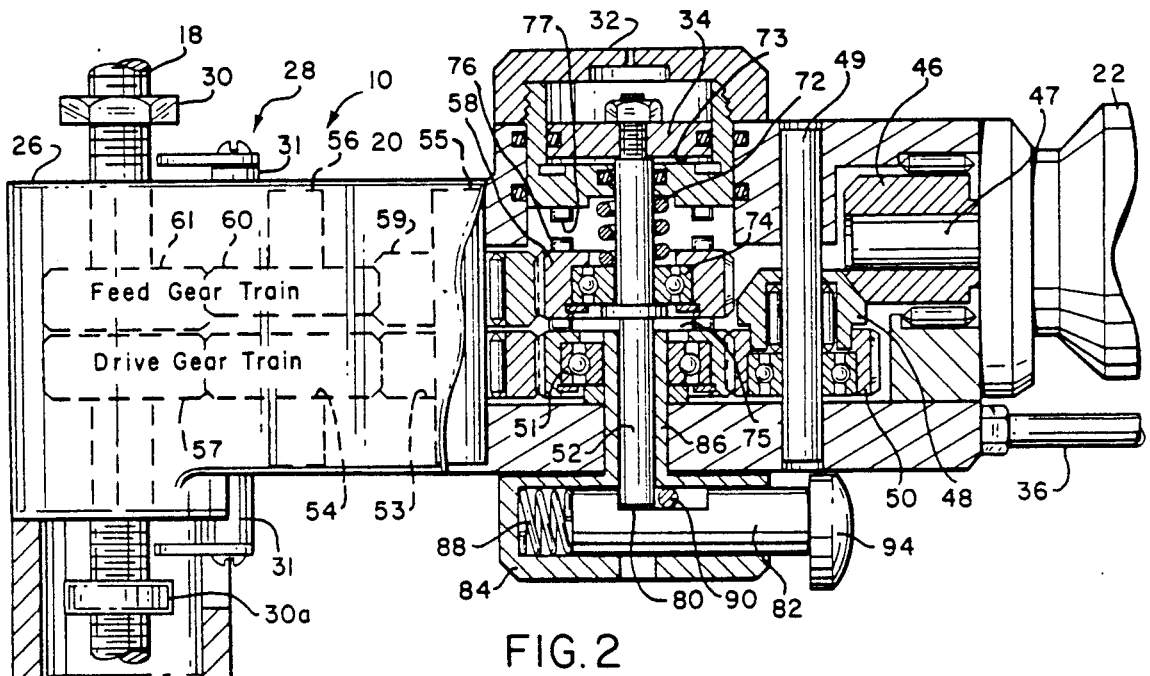
FIG. 2 is a vertical cross section of part of a prior-art drill which adds to the drill shown in FIG. 1 the feature of a retract mode followed by an idle mode in the spindle feed as disclosed in U.S. Pat. No. 4,612,998.
Figure 3:
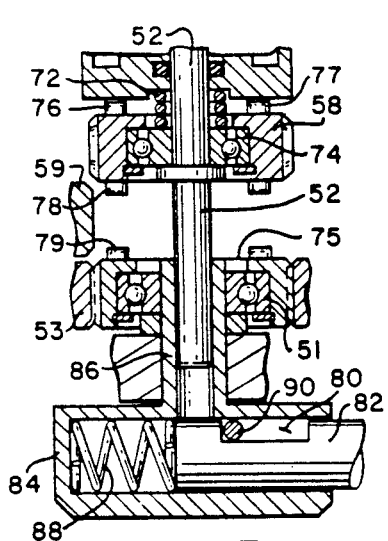
FIGS. 3 and 4 illustrate in enlarged vertical cross sections that part of the prior-art drill shown in FIG. 2 embodying the idle mode latching means in both the retract mode and the idle mode, respectively.

The difference between this idle mode of the present invention and the idle mode of the prior art shown in FIGS. 2, 3 and 4 is not only in transferring the hydraulically actuated piston from the top of the shaft 52' to the bottom to free the top of the shaft for components used in the control of the rapid advance mode, but also in adding a rapid advance spindle feed gear 115 at the top of and keyed to the shaft 52'. The keys are integral to the gear 115 and fit into slots parallel to the shaft axis so that the shaft 52' will slide up and down in the gear 115. The spindle drive gear 51' is similarly keyed to the shaft 52' so that the shaft will slide up and down in that gear. The regular spindle feed gear 58 on the shaft 52' is journaled on the shaft 52' by ball bearings so that it rotates with the spindle drive gear 51' when its lower side teeth 78 shown in FIGS. 3 and 4 engage the side teeth 79 of the spindle drive gear 51' as in the prior-art embodiment of FIG. 2. The difference is that the shaft 52' is raised from the bottom by the piston 112 to disengage those side teeth. The rapid advance gear 115 rotates freely at the normal spindle drive speed, because the drive gear train and shaft 52' are being driven at a constant speed through the drive coupling gear 51'. An auxiliary feed idle gear 119 is thus caused to be constantly rotating at a greater speed than the normal feed idle gear 59' because of the greater size of the rapid advance coupling gear 115 than the normal feed coupling gear 58.

When the piston 112 is raised by hydraulic pressure in response to a valve actuated by the valve stem 31 (FIG. 2), the upper side teeth 76 of the feed coupling gear 58 engage side teeth 77' that are held in a fixed position relative to the positive feed drill housing to lock the spindle feed train and thereby retract the spindle 18. The positive feed drill is then in the retract mode in a very similar way as that shown in FIG. 3. After the spindle has been retracted, the valve stem 31 will have been pushed back up to release the hydraulic pressure on the piston 112. The piston rod 114 drops onto the rod 82 in a manner similar to that shown in FIG. 4 for the shaft 52 in the prior-art idle mode, and the spindle feed coupling gear 58 drops with the shaft; the lower side teeth 78 of the gear 58 do not yet engage the side teeth 79 of the spindle drive gear as shown in FIG. 2. The positive feed drill is then in the idle mode corresponding to that shown for the prior art in FIG. 4. To put the drill back into positive feed drill mode, the idle-mode control button 94 is pushed in until the piston rod 112 drops back into the notch 80, again similar to the manner in which shaft 52' drops in the notch 80 as shown in the prior-art FIG. 2.

When the rapid advance button 100 is depressed to admit hydraulic pressure to the piston 112 and then released, the positive feed drill with this rapid advance feature will cycle through the rapid advance mode, to be described in more detail, and end in the idle mode. To reset the drill in the positive feed drill mode, the button 94 is pushed in as just described.

When the button 100 is depressed all the way to the end so that the beveled end 103 of the rod 102 is completely over the beveled surface 104 of the idle-stop disk 105, the idle-stop disk will hold the shaft 52' in the idle position and not permit the shaft 52' to be raised further into the retract mode position, and at the same time pushing the button 100 in will at the last moment open the air valve 107 to admit air under pressure to the pistons 112 and 118. The piston 118 will push down on the auxiliary (rapid advance) idle gear 119 moving it into engagement with idle gear 59'; thus doubling the speed of the spindle feed gear train now driven by the rapid advance feed coupling gear 115. Thus, air pressure from the same valve 107 (FIG. 6) which pushes the piston 112 up is also admitted through passages in the drill housing to push down on piston 118 over the top of an idle gear shaft 55'.

It should be noted that when air is admitted under pressure to raise the piston 112 through the valve 107 for rapid advance, the shaft 52' is raised sufficiently for the piston rod 114 to clear the notch 80, but the beveled end 103 of the rapid advance control rod 102 over the beveled surface 104 will provide sufficient downward force over the shaft 52' through needle thrust bearing 105a to prevent side teeth 76 of the normal feed coupling gear 58 from engaging teeth 72' affixed to the housing. A thrust washer 105b is provided between the feed coupling gear 115 and the housing, but the shaft 52' is free to slide up and down inside the gear 115. Since the shaft 52' must move up a greater extent for the retract mode (FIG. 3), the idle-stop disk 105 is free to move up with the shaft except during rapid advance when the idle-stop disk is held down by the end 103 of the control rod 102.

The shaft 55' has idle drive gear 53' and idle feed gear 59' for positive feed drilling or countersinking in the usual way. What has been added on the shaft 55' is the rapid advance idle gear 119 which is constantly turned by the rapid advance feed coupling gear 115 keyed to the shaft 52' as long as the motor 22 is turning the shaft 52' through the drive coupling gear 51' also keyed to the shaft 52'. The piston 112 at the bottom of the shaft 52' disengages the feed coupling gear 58 from the spindle drive gear 51' and holds it in the idle mode position. Drive for the idle gear 59' in the feed gear train thus uncoupled is then provided by the rapid advance idle gear 119 permanently driven by the rapid advance coupling gear 115. The coupling between the rapid advance idle gear 119 and the feed idle gear 59' is through an annular clutch plate 120 connected to the bottom of the idle gear 119 by a sleeve 121 which widens on the bottom to form the clutch plate 120. An annular clutch plate 122 is connected to an integral sleeve 123 of the idle gear 59'. The clutch plate 120 mates with the clutch plate 122 when it is pushed down by the piston 118 against the force of a spring 124. A collar 125 fixed in position on the shaft 55' by a set screw 126 provides a seat for the spring 124 used to adjust the engagement force between the annular clutch plates in order that the spindle thrust can be adjusted according to the needs of the task to which the positive feed drill is being applied.

In order to facilitate the adjustment of that engagement force without disassembly of the drill, the shaft 55' is made hollow and a longitudinal slot is provided through the hollow shaft wall in order that the set screw 126 for the collar 125 may engage an annular V-slot in a rod 127 which threads into the hollow shaft 55'. A tool inserted into the hollow shaft 55' from the bottom may then engage the rod 127 to thread it in or out, thereby moving the position of the set screw 126 to adjust the spindle forward thrust.

Since piston 112 can be actuated from valve 31 (FIG. 2) and also from valve 107, two ball check valves 128 and 129 have been placed in the wall of the cup 113 in such a manner that air from valve 107 is admitted to piston 112 through the ball check valve 128 against the force of a spring closing the check valve with a ball, and air from valve 31 is also admitted to piston 112 through the ball check valve 128 against the force of a spring closing that check valve with a ball. Thus, normal operation from valve 31 does not interfere with the rapid advance system and rapid advance valve 107 does not interfere with normal operation of valve 31.

Although the proper arrangement of parts relative to each other have been shown in the drawings, the proportions of various parts shown have not been drawn precisely to scale. However, those skilled in the art can readily scale the various parts for proper proportions necessary for carrying out the functions ascribed to them, and although particular embodiments of the invention have been described and illustrated herein, it is recognized that modifications and variations may readily occur to those skilled in the art. Consequently, it is intended that the claims be interpreted to cover such modifications and variations.

What is claimed is:

1. A positive feed drill having a drive gear train comprised of a drive coupling gear keyed to a motor driven shaft for turning a spindle carrying a cutting tool at a predetermined rate and a feed gear train comprised of a feed coupling gear driven through a clutch by said drive coupling gear and an idle gear for advancing said spindle at a predetermined rate as said cutting tool drills through a work piece, and further having means for automatically retracting said spindle after it has been advanced a predetermined extent by disengaging said clutch and engaging means for locking said feed coupling gear, and means for automatically placing said feed gear train in an idle mode upon retracting said spindle by disengaging said locking means without engaging said clutch, a rapid advance gear train, actuatable control means for coupling said rapid advance gear train to said idle gear of said feed gear train, and control means for placing said feed gear train in an idle mode if not already in an idle mode by disengaging said clutch between said feed coupling gear and said drive coupling gear without engaging said means for locking said feed coupling gear and actuating said control means for coupling said rapid advance gear train to said idle gear of said feed gear train, said rapid advance gear train having a higher gear ratio than said feed gear train for advancing said spindle at a higher rate while said actuatable control means is being actuated.

2. A positive feed drill as defined in claim 1 wherein said actuatable control means comprises a clutch and means for adjusting the engagement force of said clutch so that forward thrust of said spindle during rapid advance may be adjusted through said clutch.

3. In a positive feed drill having a spindle drive gear train coupled to a motor by a drive coupling gear, a spindle feed gear train having a feed coupling gear, an idle gear, and means for locking said feed coupling gear, said feed coupling gear being coupled to said drive coupling gear by a clutch between said drive coupling gear and said feed coupling gear, means for automatically retracting a spindle thereof once a drill bit connected thereto has been advanced a predetermined extent, said retracting means comprising means for disengaging said clutch between said drive coupling gear and said feed coupling gear and engaging said locking means with said feed coupling gear, means for automatically disengaging said locking means once said spindle has been fully retracted, leaving said positive feed drill in an idle mode until said clutch between said drive and feed coupling gears is engaged, a rapid advance control of said spindle on command by an operator, comprising a rapid advance drive gear keyed to turn at a constant rate with said drive coupling gear, a rapid advance idle gear meshed with said rapid advance drive gear, said rapid advance idle gear being of a size relative to said rapid advance drive gear as to provide a higher gear ratio for rapid advance than between said drive and feed coupling gears for normal spindle feed, a clutch between said rapid advance coupling gear and said idle gear in said feed gear train, and manual control means for actuating said means for disengaging said clutch between said drive coupling gear and said feed coupling gear without engaging said locking means with said coupling gear for automatically retracting said spindle, thereby placing said feed coupling gear in an idle mode, and simultaneously engaging said clutch between said rapid advance idle gear and said idle gear in said normal feed gear train for rapid advance of said spindle.

4. Rapid advance control for a positive feed drill as defined in claim 3 wherein said clutch between said rapid advance idle gear and saID idle gear in said normal feed train is comprised of a friction clutch having one annular plate fixed on said idle gear in said normal feed train and one annular plate fixed on rapid advance idle gear, and both idle gears are on a common shaft.

5. Rapid advance control for a positive feed drill as defined in claim 4 including means for adjusting the engagement force of said clutch plates so that forward thrust of said spindle during rapid advance may be adjusted.

6. In a positive feed drill having: a spindle drive gear train driven by a drive coupling gear on a shaft; a spindle feed gear train driven by a feed coupling gear on said shaft and coupled to said drive coupling gear by opposing side teeth on said respective drive and feed coupling gears mounted on said common shaft, wherein the journal for said feed coupling gear is over a collar on said shaft, whereby said feed coupling gear and drive coupling gear may be uncoupled by displacing said shaft to raise said feed coupling gear from said drive coupling gear; a spring over said feed coupling gear to bias said feed coupling gear against said drive coupling gear thereby to bias said shaft to a position where said feed coupling gear is coupled to said drive coupling gear; locking teeth fixed relative to the axis of said common shaft for engagement with side teeth on said feed coupling gear on the side thereof opposite said drive coupling gear; first actuatable means for moving said shaft against said spring to raise said feed coupling gear and thereby disengage said feed coupling gear from said side teeth of said drive coupling gear and engage said upper side teeth of said feed coupling gear with said fixed teeth to retract said spindle, and upon deactuation of said actuatable means to automatically allow said upper side teeth of said feed coupling gear to be disengaged from said fixed teeth, thereby terminating retraction of said spindle; spring biased means responsive to said shaft being moved to a position for said upper side teeth of said feed coupling gear to engage said fixed teeth upon actuation of said actuatable means, means for limiting the return of said shaft upon deactuation of said actuatable means once said actuatable means has been actuated to move shaft and feed coupling gear into locking position of said feed coupling gear, said spring biased means having a notch the depth of which limits the return of said shaft so that said upper side teeth of said feed coupling gear are disengaged from said fixed teeth but said opposing side teeth of said feed and drive coupling gears are not re-engaged, thereby causing an idle mode of operation until said spring biased means is manually reset to place said notch under said shaft, thereby terminating said idle mode of operation; and a rapid advance system for said positive feed drill comprising a rapid advance spindle feed coupling gear keyed to turn with said common shaft, an idle gear shaft, an idle feed gear supported on said idle gear shaft and driven by said feed coupling gear until said feed coupling gear is raised to disengage side teeth of said feed coupling gear from side teeth of said drive coupling gear, a rapid advance idle gear on said idle gear shaft meshed with said rapid advance spindle feed coupling gear, said rapid advance idle gear being smaller than said rapid advance feed coupling gear for a higher speed gear ratio than between said feed coupling gear and said idle feed gear, a spring between said rapid advance idle gear and said idle feed gear to space said rapid advance idle gear away from said idle feed gear, a second actuatable means over said rapid advance idle gear for moving said rapid advance the gear toward said idle feed gear, rapid advance coupling means between said rapid advance idle gear and said idle feed gear for engaging both gears on said idle gear shaft to turn together when said second actuatable means moves said rapid advance idle gear toward said idle feed gear on said idle gear shaft, and a manually actuated rapid advance control means for causing said first actuatable means and said second actuatable means to be actuated for placing said positive feed drill in a mode of operation for rapid advance of said spindle until said rapid advance control means is released.

7. A rapid advance system as defined in claim 1 wherein said coupling means between said rapid advance idle gear and said idle feed gear is comprised of a clutch having one annular plate fixed on said idle feed gear and one annular plate fixed on said rapid advance idle gear.

8. A rapid advance system as defined in claim 2 including means for adjusting the engagement force of said clutch plates so that forward thrust during rapid advance may be adjusted.

* * * * *